May 15, 1934.  L. M. APPLEGATE  1,959,016
OSCILLATORY MOTOR
Filed Oct. 27, 1930
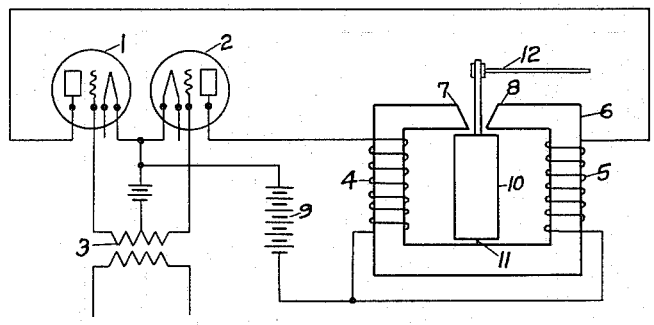
FIGURE I
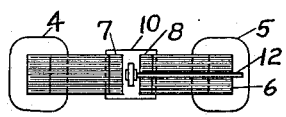
FIGURE II
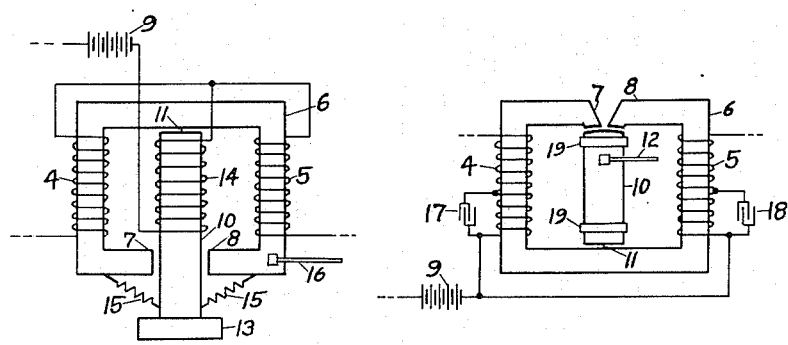
FIGURE III  FIGURE IV
Inventor
Lindsay M. Applegate Patented May 15, 1934

1,959,016

UNITED STATES PATENT OFFICE 1,959,016

OSCILLATORY MOTOR

Lindsay M. Applegate, Seattle, Wash.

Application October 27, 1930, Serial No. 491,511

13 Claims. (Cl. 175—338)

This invention relates to the conversion of electric energy into mechanical energy. The object of this invention is to provide an oscillatory motor of relatively high efficiency, simple and economical in form, and capable of operating over a wide range of frequencies with certain kinds of electric circuits. In most oscillatory motors the structure includes permanent magnets or electromagnets for providing a polarizing field in which a coil, or a magnetic part influenced by a coil or coils, carrying alternating or undulating currents, is caused to oscillate. These polarizing field magnets or their coils are not part of the power circuit itself, but provide what may be thought of as a stationary part or field against which the power circuit or magnetic parts controlled by the power circuit react to produce motion. They are thus a relatively inert part of the structure. Furthermore, these field magnets must provide, for good operation, a field that is relatively intense compared with that which may be considered as being produced by the power circuits and the moving parts. One object of my invention is to produce an oscillatory motor that operates without permanent or electro-field magnets apart from the power circuit, gaining as a result economies of construction and improvement in performance.

Another object of my invention is to avoid the necessity of interposing transformers between the power circuits and the motor, as is found desirable or necessary in most oscillatory motors in general use. In most of the oscillatory motors heretofore known in the art, the so-called direct or average component of the unidirectional current delivered by audions used to drive oscillatory motors is detrimental to the operation of the motors, or at least is undesirable. Transformers are used in these to prevent this current entering the motor coils. In my invention, this component of the current of audions is rendered unobjectionable. Also, in most oscillatory motors heretofore known in the art, the limitations of design are such that they require the use of transformers for "impedance matching". One of the objects of my invention is to provide a motor which will permit efficient mechanical designs which will accommodate coils of any impedance likely to be desired, rendering transformers for "impedance matching" unnecessary.

Finally, it is an object of my invention to provide, as a result of eliminating transformers and auxiliary field structures which limit to some extent the ranges of frequencies over which oscillatory motors which use them can operate satisfactorily, an oscillatory motor which offers the improvement in performance to be gained by the elimination of these accessories.

The field of application of my invention includes sound producing apparatus such as is used in radio reception. In such applications my invention is used with radio receiving apparatus, amplifiers, diaphragms, and the like.

My invention is intended to be used with electrical systems now known in the art. Among these are the systems known as push-pull circuits. These circuits are characterized by the transmission of energy in two undulating unidirectional currents which alternately increase and decrease in accordance with the undulations or alternations of a controlling electric energy delivered to the circuit, and when either one of the transmitted currents increases, the other transmitted current decreases.

What my invention comprises is set forth in the following specification and succinctly defined in the appended claims. In the accompanying drawing Figure I shows the principal elements of my invention, Figure II shows a second view of my invention, omitting some easily visualized elements shown in Figure I, Figure III shows the subject matter of Figure II in modified form with additions, Figure IV shows the subject matter of Figure II with additions in the way of refinement.

In Figure I, two audions 1 and 2, a source of control energy 3, for example a transformer, and a source of current 9 are arranged in a push-pull circuit of conventional form. Two coils 4 and 5 are connected to audions 1 and 2 respectively, and to the source of current 9. Coils 4 and 5 are electromagnetically associated with a magnetic core 6 which is provided with the pole pieces 7 and 8. A magnetic element 10 is movably supported in a position to carry magnetic flux from the middle of core 6 to pole pieces 7 and 8. A flexible connection 11 supports element 10, which is provided with a mechanical part 12 for transmitting motion of element 10 to elements, not part of my invention, as desired. Various instrumentalities, usually associated with push-pull circuits but which are not necessary for the explanation of my invention, have, for convenience, been omitted from Figure I.

Referring to the well understood characteristics of push-pull circuits, it will be observed that, with an alternating or undulating current delivered to transformer 3, the currents transmitted by audions 1 and 2 to coils 4 and 5 will alternately increase and decrease in synchronism with the undulations of the control voltage impressed on audions 1 and 2 by the transformer 3. When the current in coil 4 increases, that in coil 5 decreases. When the current in coil 4 decreases, the current in coil 5 increases. Inasmuch as the characteristics of push-pull circuits are widely known, the above explanation of the circuit comprising audions 1 and 2, source of energy 3, coils 4 and 5, and source of energy 9, is deemed sufficient, in so far as the relationship of these elements is concerned.

The undulating currents in coils 4 and 5 cause magnetomotive forces and magnetic fluxes to exist in the magnetic core 6 and the magnetic element 10. The polarities of the coils 4 and 5 are preferably arranged so that the fluxes through them are combined in the same direction in the element 10. Ordinarily, the average currents in coils 4 and 5 are equal, the average fluxes therein also are equal, and the average flux in element 10 is twice the average flux in either of the coils 4 or 5, providing the magnetic circuit is symmetrical about the center of element 10. Also, in operation, the undulations of the currents in coils 4 and 5 occur so that the momentary increases in flux in either of the coils 4 or 5 are accompanied by momentary decreases in flux in the other of the coils 5 or 4, with corresponding increases and decreases of flux in the pole pieces 7 and 8. The resultant effect of a simultaneously occurring increase of flux in one pole piece 7 or 8, and decrease of flux in the other pole piece 8 or 7, is to leave the flux in element 10 substantially unchanged at its average value. The momentary increase in flux passing from pole piece 7 or 8 to element 10, and the corresponding decrease in flux passing from pole piece 8 or 7, causes element 10 to move momentarily toward the pole piece whose flux is increasing and from the pole piece whose flux is decreasing. With undulating currents transmitted to coils 4 and 5 by audions 1 and 2, the motion of element 10 is oscillatory. If the motion of element 10 is such that the spaces between it and the pole pieces 7 and 8 are varied materially, the reluctance of the spaces may become decidedly unequal, and the flux in the pole toward which element 10 moves may increase considerably more than the flux in the other pole decreases. This is apparent from a consideration of the fact that, if most of the reluctance of the magnetic circuits is in the airgaps, a decrease of one-half the length of one, and a corresponding increase of one-half the length of the other will result in approximately doubling the flux in one pole and decreasing the flux in the other pole to one-half. Thus the flux in one pole becomes momentarily four times as great as that in the other. The fluxes being combined additively in element 10, their sum will increase to five-fourths of its original value. If element 10 then moves back through center toward the other pole, the flux in it will decrease to its original value and rise again to five-fourths. Accordingly, in element 10 the flux will undulate between a definite minimum value and a maximum value, but will be always in the same direction.

If through inadvertance or choice the polarities of the coils 4 and 5 are arranged so that the fluxes caused by them are combined differentially in element 10 instead of additively, the resultant flux in element 10 will be the difference between the two fluxes flowing in pole pieces 7 and 8 instead of their sum. If the magnetic and electric circuits are symmetrical and the fluxes and currents are equal, the resultant flux in element 10 is zero. In operation, when the fluxes are undulating, first one and then the other being the greater, the resultant flux in element 10 is alternating. This, of course, introduces hysteresis and eddy current losses in element 10. However, under operating conditions, the maximum undulating difference between the two fluxes in pole pieces 7 and 8 may be considerably less than their sum, so that satisfactory operation is obtained with a smaller area of magnetic material in element 10 than would be required for carrying the fluxes of pole pieces 7 and 8 combined additively without saturation. Under these conditions, if the flux-carrying area of element 10 is relatively small, a large undulating difference between the fluxes in pole pieces 7 and 8 may cause saturation in element 10 by the resultant alternating flux, consequently preventing the attainment of the force that would be attained without such saturation, and causing unnecessarily large hysteresis and eddy current losses. Hence, the preferred arrangement, in which the fluxes carried by pole pieces 7 and 8 are combined additively in element 10, is usually desirable when the undulations of the currents in coils 4 and 5 are a large proportion of their average values.

If the audions 1 and 2 are adjusted so that the plate currents are small when the alternating voltage delivered by transformer 3 is zero, and increase when the alternating voltage of transformer 3 increases, the operation of the system is different in some respects from that described above. Assuming an alternating voltage at transformer 3, the plate current of one audion, 1, for example, will increase from its initial value while the other plate current, that of 2, will remain near its initial value, possibly dropping to zero. Then the plate current of 1 will return to its initial value and the plate current of 2 will execute its part of the cycle of increasing and decreasing, while the plate current of 1 remains near or below its initial value. This kind of operation is sometimes called "class B" operation. Under these conditions coil 4 will be subjected to an increase and a decrease of current, while coil 5 sustains practically no change from its initial current during half a cycle, and then coil 5 will undergo an increase and decrease of current while the current in coil 4 remains at a low value. The magnetomotive forces across the airgaps at poles 7 and 8 will undergo variations which are consistent with the current variations in coils 4 and 5. The flux in the magnetic element 10 will be either alternating at the frequency of the voltage in transformer 3 or unidirectional, varying at double the frequency of the voltage at transformer 3, depending upon the relative polarity of coils 4 and 5. In either condition, magnetic element 10 will oscillate at the frequency of the voltage in transformer 3 as described for the conditions when the plate currents of audions 1 and 2 vary above and below average values.

The magnetic core 6, in which the magnetic fluxes are undulatory, should be constructed in accordance with the usual practice in magnetic circuits carrying undulating or alternating fluxes, and should have relatively little magnetic reluctance. It may be composed of insulated magnetic lamina, which, incidentally, facilitate the use of dove-tailed joints in the magnetic structure. Magnetic element 10, in which the flux is not ordinarily subject to material momentary variations, may be constructed accordingly, and it may have residual or permanent magnetism, if the connections of coils 4 and 5 are such as to cause the flux in element 10 to be substantially unvarying. In general, the entire magnetic structure, including magnetic core 6, pole pieces 7 and 8, magnetic element 10, and the non-magnetic spaces in the magnetic circuit, should be constructed with the minimum of reluctance, but the flux density in the parts of the magnetic circuit which carry undulating flux, especially the core 6, should ordinarily be such that it would be in the so-called straight part of the magnetization curve of the material used, in the region of maximum permeability. For ordinary silicon steel this corresponds to a flux density of the order of 5,000 gausses. The use of flux densities of this order of magnitude avoids magnetic saturation, and yet permits an economical use of magnetic material. The reluctance of the non-magnetic airgaps between the pole pieces 7 and 8 and element 10, particularly in forms of the invention in which the airgaps must be sufficiently large to accommodate the relative motion of magnetic parts as shown in Figure III, is usually much greater than the reluctance of the magnetic parts themselves, providing saturation is prevented. Hence, it is not always necessary to use as great an area of magnetic material in all parts of the magnetic circuit, such as core 6, as is used at the airgaps between pole pieces 7 and 8 and element 10. The greater the relative movement of the magnetic parts, the greater must be the length of the airgaps. Hence, when large movements are required, the area of the airgaps between pole pieces 7 and 8 and element 10 may have to be materially greater than the areas of other parts of the magnetic circuits, especially core 6 inside the coils 4 and 5, in order to obtain the required total airgap flux without making the coils 4 and 5 unnecessarily large.

The shapes and spacings of pole pieces 7 and 8, magnetic element 10, and hence the non-magnetic space between them are preferably such that the reluctance of the space between pole piece 7 and pole piece 8 is greater than that of the space between either pole and element 10. The reason for this is that, for the best operation, the magnetic fluxes produced by coils 4 and 5 should be separate and distinct in the two respective magnetic circuits, except where they are combined in element 10, which is common to the two magnetic circuits excited by coils 4 and 5 respectively. The shapes and spacings of pole pieces 7 and 8 and element 10 should also be such that element 10 is maintained in a substantially central position with respect to core 6 and pole pieces 7 and 8, about which central position oscillatory motion may take place. This centering of element 10 is accomplished by shaping the adjacent surfaces of element 10 and pole pieces 7 and 8 so that the total reluctance of the space between element 10 and pole pieces 7 and 8 is a minimum when element 10 is in a central position, and is increased when element 10 is moved either way from its central position. Element 10 then will tend to maintain the center of its path of oscillation in the position in which the flux through element 10 is a maximum, and will take a substantially central position when the currents in coils 4 and 5 are equal.

Figure II, in which the numerals refer to the same elements as designated by them in Figure I, shows a second view of these elements. Regarding Figure I as a side view, Figure II may be considered a top view.

Figure III shows certain elements of Figure I in modified form with additional elements. Elements 4 to 10 inclusive represent the same elements as they do in Figure I. An important difference between Figures I and III is that in Figure I, in the motion of element 10 relative to pole pieces 7 and 8, the airgap distances between the pole pieces 7 and 8 and element 10 are not changed materially, while in Figure III, in the motion of element 10 relative to pole pieces 7 and 8 the airgap distances between the pole pieces 7 and 8 and element 10 alternately increase and decrease. In Figure III the magnetic element 10 is arranged to be stationary, with elements 4 to 8 inclusive movable. Element 10 is provided with a support 13 and a coil 14. Some elements 15, in mechanical tension or compression, such as springs, are connected between magnetic core 6 and element 10 to prevent element 10 from coming in contact with either of the pole pieces 7 and 8. Coil 14 is connected as shown with coils 4 and 5, and also to source of current 9. Coils 4 and 5 are, as in Figure I, connected respectively to audions 1 and 2. Motion of the magnetic core 6 is communicated to other elements by a mechanical part 16. In the operation of the arrangement shown in Figure III, the action of coils 4 and 5 is as set forth in the discussion of Figure I. Since a momentary increase of current in one of the coils 4 or 5 is accompanied by a substantially equal momentary decrease of current in the other coil 5 or 4, there will be practically no variation, under ordinary conditions, of the current in coil 14. Hence the effect of coil 14 is more or less the same as if element 10 had a permanent magnetomotive force of its own, as suggested in the discussion of Figure I. The mechanical arrangement shown in Figure III, in which coils 4 and 5 and core 6 move, is desirable principally in applications of the invention in which the frequency of oscillation is low. For those applications in which the frequencies are high, the moving parts should be as light as possible. Accordingly, for sound frequencies, it is better to use an arrangement in which coils 4 and 5 and core 6 are stationary, and in which element 10 oscillates, as in Figure I.

Figure IV shows elements 4 to 12, inclusive, as in Figure I, with certain modifications and additions. Coils 4 and 5 have been modified to enable two condensers 17 and 18 to be connected in parallel with parts of coils 4 and 5 respectively. The purpose of the addition of condensers 17 and 18 is to enable coils 4 and 5 to accommodate more extensive ranges of frequencies than they could as simple coils, thereby tending to maintain more nearly uniform efficiency of operation over an extended range of frequencies than would be possible without condensers 17 and 18. Magnetic element 10 is provided with short circuited conductors 19 which encircle element 10. The purpose of the conductors 19 is to assist in stabilizing the magnetic flux in element 10 by tending to prevent rapid changes of flux therein.

In Figure I, if from any cause the grid circuit of one of the audions becomes inoperative, for example if one half of the secondary coil of the transformer 3 becomes short circuited or otherwise inoperative, the audion thus affected will be unable to deliver undulating current, although it can still deliver direct current, operating as a resistance, while the remaining operative audion will continue to function as described for Figure I above. The result is that one of the coils produces a substantially constant flux in the pole with which it is associated, and the other produces an undulating flux. The moving element 10 will then be subject to varying fluxes and attractive forces and will oscillate even though only a single undulating current is available. The power that can be handled by the motor will, however, be only about half what it can handle with the two audions both operating. Also it will not be possible to combine the fluxes in element 10 so the resultant flux therein remains nearly constant as set forth for the preferred mode of operation. While the possibility of operating the motor with one of the audions not functioning completely has the disadvantages mentioned, it is nevertheless of use where only one undulating current is available.

Figures I to IV inclusive are intended primarily to illustrate the principles of my invention, but they are also illustrative of suitable mechanical forms thereof.

I claim:

1. An oscillatory motor comprising two magnetic circuits each with a coil and a movable magnetic element common to both magnetic circuits, the coils being connected to receive undulating currents whose intensities alternate between the two coils, said currents causing magnetic fluxes which alternate in intensity in the two magnetic circuits, whereby the movable magnetic element is caused to oscillate relative to the stationary parts of the magnetic circuits.

2. An oscillatory motor comprising a magnetic circuit of three parts, of which one part is movable relative to the other two parts which are stationary and each of which has a coil, the coils being connected to receive currents whose intensities alternate between the two coils, which cause in the stationary parts of the magnetic circuit magnetic fluxes whose intensities similarly alternate, and cause a resultant flux in the movable part of the magnetic circuit, whereby it is caused to oscillate relative to the other two parts.

3. An oscillatory motor comprising a two-pole magnetic circuit, a movable magnetic element supported in the magnetic circuit in such a way as to form a magnetic path between the ends of the two poles and a substantially central part of the magnetic circuit, and a coil associated with each of the poles, the coils being connected in parallel to receive an undulating unidirectional current whose intensity alternates between the two coils, whereby the movable magnetic element is caused to oscillate between the poles.

4. An oscillatory motor comprising a magnetic circuit having two poles each with a coil, and a movable magnetic element supported between a substantially central part of the magnetic circuit and the ends of the two poles, the coils receiving unidirectional currents which undulate relative to each other, causing correspondingly undulating fluxes in the poles, thus causing the movable magnetic element to oscillate.

5. An oscillatory motor comprising a two-pole magnetic circuit, a movable magnetic element supported in the magnetic circuit in such a way as to form a magnetic path between the ends of the two poles and a substantially central part of the magnetic circuit, and a coil associated with each of the poles, the coils being connected to receive currents whose intensities undulate between the two coils, the current in one coil increasing during the time when the current in the other is decreasing, and vice versa, whereby the moving element is caused to oscillate relative to the poles.

6. An oscillatory motor comprising a magnetic circuit having two poles, each with a coil, and a movable magnetic element supported between a substantially central part of the magnetic circuit and the ends of the two poles, the coils being connected together to receive a current which divides between the two coils, the part of the current in each coil undulating relative to the other, increasing in one coil while decreasing in the other and vice versa, thus causing the movable magnetic element to oscillate relative to the poles.

7. An oscillatory motor comprising a magnetic circuit having two poles, each with a coil, and a movable magnetic element supported between a substantially central part of the magnetic circuit and the ends of the two poles, the coils being connected to receive currents which increase in one coil while decreasing in the other coil and vice versa, causing the poles to carry magnetic fluxes which similarly increase and decrease alternately, whereby the movable magnetic element is caused to oscillate relative to the poles.

8. An oscillatory motor comprising a two pole magnetic circuit with a coil on each pole, a movable magnetic element supported between the poles of the magnetic circuit, and magnetically connected to a substantially central part of the magnetic circuit, and elastic members connected between the movable element and the stationary part of the magnetic circuit to prevent excessive relative motion, the coils receiving currents which undulate alternately in the coils, increasing in one while decreasing in the other and vice versa, whereby the movable element is caused to oscillate between the poles.

9. An oscillatory motor comprising a magnetic circuit of two poles, each with a coil, a movable magnetic element supported between a substantially central part of the magnetic circuit and the ends of the two poles, the coils being connected in parallel for receiving an undulating unidirectional current whose intensity alternates between the two coils, whereby the magnetic circuit is caused to carry two undulating unidirectional magnetic fluxes, and the movable magnetic element to carry a magnetic flux which is the additive resultant of the two undulating unidirectional magnetic fluxes, and the movable magnetic element is caused by the interaction of the magnetic fluxes to oscillate.

10. An oscillatory motor comprising a magnetic circuit of two poles, each with a coil, a movable magnetic element supported between a substantially central part of the magnetic circuit and the ends of the two poles, the coils being connected in parallel for receiving an undulating unidirectional current whose intensity alternates between the two coils, whereby the magnetic circuit is caused to carry two undulating unidirectional magnetic fluxes, and the movable magnetic element to carry a magnetic flux which is the resultant of the two undulating unidirectional magnetic fluxes, and the movable magnetic element is caused by the interaction of the magnetic fluxes to oscillate.

11. An oscillatory motor comprising a magnetic circuit of two poles, each with a coil, a movable magnetic element supported between a substantially central part of the magnetic circuit for the ends of the two poles, the coils being connected in parallel and receiving an undulating unidirectional current whose intensity alternates between the two coils, whereby the magnetic circuit is caused to carry two undulating unidirectional magnetic fluxes, and the movable magnetic element to carry a magnetic flux which is the differential resultant of the two undulating unidirectional magnetic fluxes, and the movable magnetic element is caused by the interaction of the magnetic fluxes to oscillate.

12. An oscillatory motor comprising a magnetic circuit of two poles each with a coil, and a movable magnetic element supported between a substantially central part of the magnetic circuit and the ends of the two poles, the magnetic circuit and element being composed of magnetic material of low magnetic retentivity, the coils being connected in parallel for receiving an undulating unidirectional current whose intensity alternates between the two coils, thus causing the movable magnetic element to oscillate between the poles.

13. An oscillatory motor comprising a magnetic circuit of two poles, each with a coil, a movable magnetic element supported between a substantially central part of the magnetic circuit and the ends of the two poles, the magnetic circuit and element being composed of magnetic material of low magnetic retentivity, the coils being connected in parallel for receiving an undulating unidirectional current whose intensity alternates between the two coils, whereby the magnetic circuit is caused to carry two undulating unidirectional magnetic fluxes, and the movable magnetic element to carry a magnetic flux which is the resultant of said two undulating unidirectional magnetic fluxes, and the movable magnetic element is caused by the interaction of the magnetic fluxes to oscillate.

LINDSAY M. APPLEGATE.